3,007,566
CASES FOR LENSES
Robert S. Morris, Southbridge, Mass., assignor to American Optical Company, Southbridge, Mass., a voluntary association of Massachusetts
Filed Apr. 13, 1959, Ser. No. 805,980
3 Claims. (Cl. 206—5)

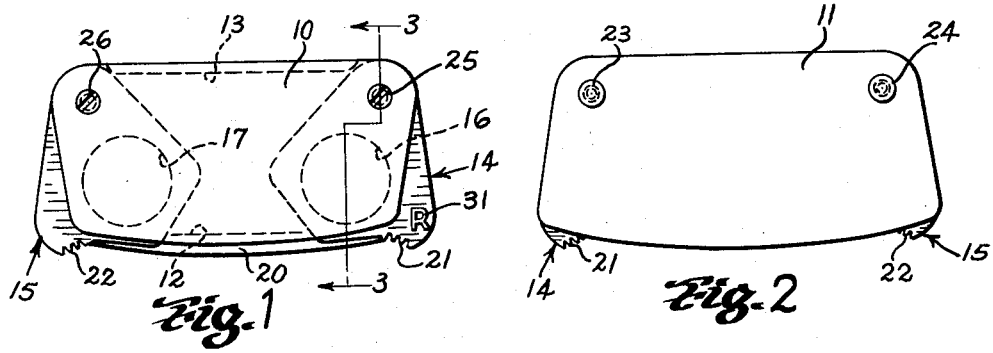
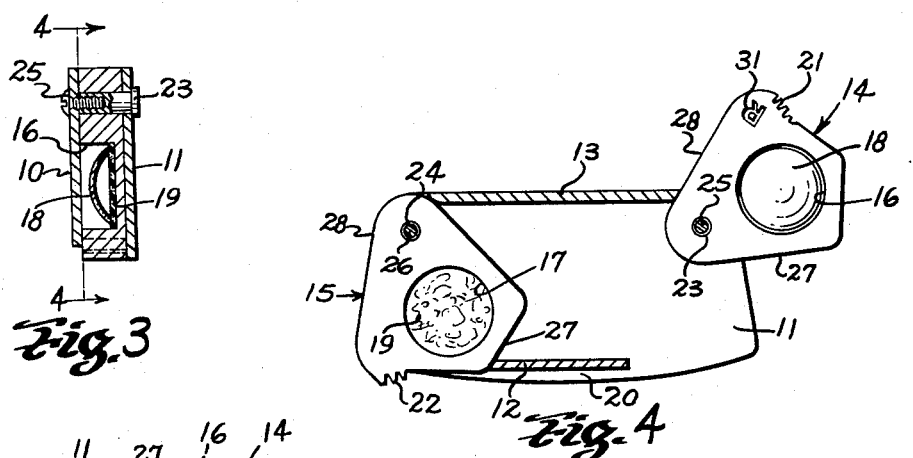
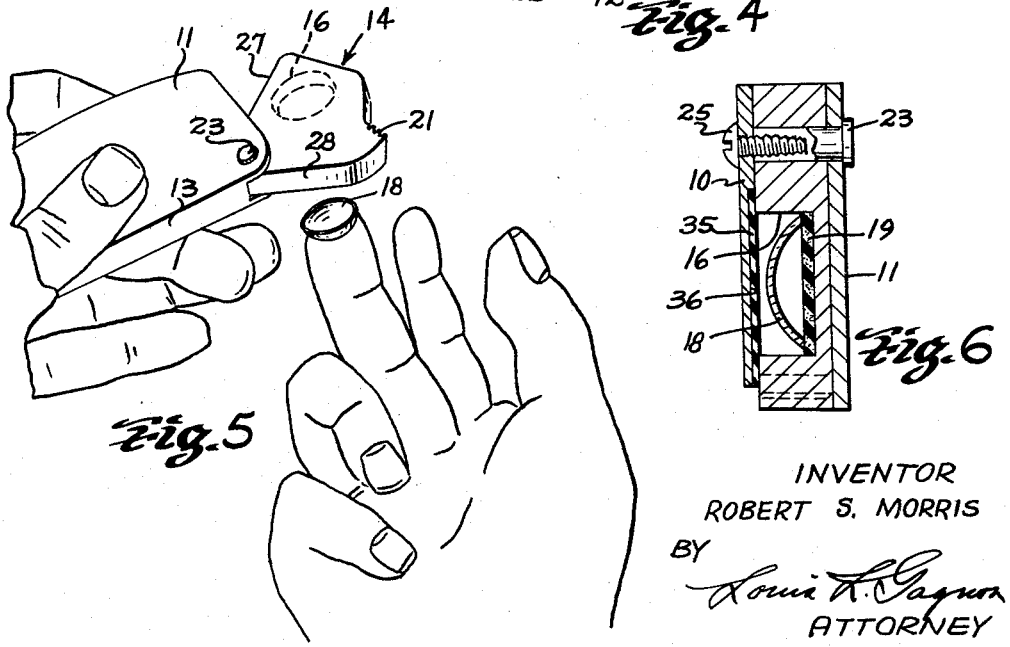
INVENTOR
ROBERT S. MORRIS
BY
*Louis L. Gagnon*
ATTORNEY

United States Patent Office 3,007,566
Patented Nov. 7, 1961

This invention relates to protective cases for lenses or the like and has particular reference to an improved carrying case for opthalmic lenses more specifically of the type worn directly on the eyes and commonly known as contact lenses.

In order to assure maximum eye comfort from properly fitted contact lenses, it is important that such lenses be kept clean and well protected from scratching or other damages due to handling, etc. when they are not in use. It has also been found that due to the fact that contact lenses are commonly manufactured of plastic materials such as polymethyl methacrylate or the like and are continually wetted by the eye secretions while in use, it is highly desirable to keep the lenses moist during periods of storage primarily for the purpose of maintaining a static condition of the geometric configurations of the material of the lenses which configurations might change slightly when said material is permitted to dehydrate.

Heretofore, various cup-shaped or tubular liquid containers having screw-on tops with gaskets and internally disposed relatively intricate lens holding clips or the like have been provided as means for storing and/or carrying contact lenses. While such containers offer adequate protection for the lenses and efficient means to moisten the same, their design renders them unattractive and rather awkward to use, requiring both hands to gain access to the lenses stored therein. When in use, one hand must hold the body part of the case while the other hand removes the cover and consequently, at least one of the separable parts of the containers must be set aside while applying a lens to the eye. Furthermore, when carried in the pockets of clothing or in handbags or the like, contact lens containers of the above type produce an undesirable bulging of the clothing or handbags due to their particular awkward shape, and in general, they have little or no aesthetic appeal.

Moreover, with conventional contact lens containers, means such as printed indicia or the like must be relied upon to identify the right and left eye lenses when in the containers. In such instances a person must select the proper lens for a particular eye in accordance with a marking on the container and often times visual identification of such markings is difficult to make, particularly under poor lighting conditions.

While it is advisable to occasionally completely immerse contact lenses in a so-called "soaking solution" for purposes of cleaning the same, it is, for the most part, only necessary to keep the lenses moist when not in use. With this in mind, the present invention overcomes the above-mentioned and other well-known drawbacks common to conventional contact lens containers by providing a unique, well-designed, compact and highly practical carrying case adapted to moisten lenses placed therein and which will serve as means in which the lenses may be soaked when necessary. It will also become apparent that with the lens case of the invention, positive identification of the right and left eye lenses may be made with or without visual examination of the case.

The principal object of the present invention, therefore, is to provide a simple, inexpensive and compact lens carrying case which will overcome the above-mentioned prior art disadvantage and which will enable the selection of the proper lens without the requirement of visual aid.

Another object is to provide a carrying case of the above character having individual lens receiving pockets for moistening and/or soaking lenses placed therein when an appropriate moisturizing or soaking solution is placed in said pockets.

Another object is provide a relatively thin and elongated compact carrying case of the above character for contact lenses having pivotable recessed lens carrying trays at the opposite ends thereof and front and back panels so designed as to render the same separately identifiable either visually or by touch to provide positive means by which a selection of a right or left eye lens contained in a known one or the other of said carrying trays may be readily made.

Another object is to provide a pocket size carrying case of the above character for storing and transporting contact lenses or the like having recessed lens supporting members formed as a non-detachable part of said case and pivotable to selectively expose or close off the recesses therein thus permitting removal of the lenses by one-hand manipulation of the case while allowing freedom of the other hand to receive the lenses, one at a time, and thereafter place the same on the eyes with a minimum of handling or fingering of the lenses.

Another object is to provide a generally flat and trimly contoured pocketsize crushproof lens carrying case of the above character which is pleasing in appearance and highly efficient in use.

Other objects and advantages of the invention will become apparent from the following description when taken in conjunction with the accompanying drawings in which:

FIG. 1 is a detailed front elevational view of the lens case embodying the invention;

FIG. 2 is a rear elevational view of the lens case;

FIG. 3 is a cross-sectional view taken substantially along line 3—3 of FIG. 1 looking in the direction of the arrows;

FIG. 4 is a cross-sectional view taken along line 4—4 of FIG. 4 looking in the direction of the arrows;

FIG. 5 is a diagrammatic illustration of the lens case of the invention in a position of use showing the preferred method of removing a lens from the case; and FIG. 6 is a cross-sectional view similar to FIG. 3 illustrating a modification of the invention.

Referring more particularly to the drawings wherein like characters of reference designate like parts throughout the various views, the device of the invention basically embodies a main supporting body section having front and back panels 10 and 11 held in substantially parallel spaced relation with each other by interconnecting webs 12 and 13. The front and back panels have a pair of recessed lens carrying members or trays 14 and 15 pivotally mounted therebetween. The above-mentioned parts are preferably formed of a rigid moldable plastic material wherein the panels 10 and 11 and connecting webs 12 and 13 would ordinarily be molded as a single integral unit and the members 14 and 15 formed separately and thereafter mounted between the panels 10 and 11. It should be understood, however, that other relatively rigid materials such as metal or wood may be used in the fabrication of the lens case of the invention.

The lens trays 14 and 15 are each of an overall thickness substantially equal to that of the spacing between panels 10 and 11 and are each provided with an outwardly opening circular lens receiving recess or pocket portion 16 and 17, respectively (see FIGS. 3 and 4). The recesses or pockets 16 and 17 are of a diameter slightly greater than that of the lenses 18 to be carried therein so as to loosely receive the same and of a depth such as to locate the outer convex meniscus surface of the lenses slightly below the adjacent side surface of the trays 14 and 15 when said lenses are placed in the recesses or pockets along with a flat relatively thin sponge member 19 at the base of the pockets, the specific purpose of which will be discussed in detail hereinafter.

Since, as mentioned above, the carrying case of the invention is more specifically designed as means to carry contact lenses, which are each carefully and accurately formed to fit a particular right or left eye of a user, the lens trays 14 and 15 are constructed as right and left lens carriers by having their respective recesses or pockets 16 and 17 both opening outwardly in the direction of the front panel 10 of the case. Thus, by holding the case with the panel 10 facing oneself, the lens tray 14 will be to the right and naturally adapted to receive a right eye lens while the tray 15 will be to the left and likewise adapted to receive a left eye lens.

In order to render the front and back panels 10 and 11 readily identifiable either visually or by touch to assure a proper selection of right or left eye lenses by a person using the case, said panels are differently contoured and of slightly different sizes. In the present instance, the back panel 11 is longer and wider than the front panel 10 and projects outwardly beyond the connecting web 12 to provide a lip 20 (see FIGS. 1 and 4) which is readily visible or identifiable by touch. As a further aid to identifying the front and back panels, it will be noted by comparing FIGS. 1 and 2 that the opposite ends of the front panel 10 are inclined or tapered inwardly towards each other to expose a substantial portion of each of the respective adjacent side surfaces of the lens trays 14 and 15 whereas the ends of the back panel 11 extend outwardly and conceal the major portion of the adjacent sides of said lens trays 14 and 15.

Referring more specifically to the details of construction of the lens trays 14 and 15, it will be noted that they are each provided with a respective serrated finger or thumb engagement portion 21 or 22 which protrudes outwardly beyond the opposed end edges of both the front and back panels 10 and 11. The trays 14 and 15 are pivotally mounted between the panels 10 and 11 by internally threaded tubular pivot posts 23 and 24, respectively, which pass through the back panel 11 and the respective lens carrying members to a position immediately adjacent the inner surface of the front panel 10. The pivot posts are held in place by screws 25 and 26 which extend through the front panel 10 and are threaded into their respective pivot posts. It should, of course, be understood that the pivot posts could be reversed to extend through the front panel and rearwardly if desired. The screws 25 and 26 are tightened sufficiently to produce a desired frictional fit between the engaging surfaces of the panels and lens carrying members so as to hold said members in any desired rotated position of use relative to the front and back panels 10 and 11 and to provide a tight dustproof seal between the respective engaging surfaces of the trays 14 and 15 and the front panel 10 to prevent dust or like from entering the lens pockets 16 and 17 when the trays 14 and 15 are closed as shown in FIGS. 1, 2 and 3. Suitable hollow rivets having their ends flanged may be used as the pivot means if desired and controlled in length to provide the proper tightness of fit of the moving parts.

In FIG. 6 the front panel 10 of the lens case has been slightly modified to include a resilient section 35 formed of a relatively soft rubber or the like which is set into a recessed area 36 on the inner side of said panel 10 at each end thereof. The resilient sections 35 are so contoured and positioned in the panel 10 as to overlie the open ends of the lens pockets 16 and 17 when their respective trays 14 and 15 are pivoted to the closed position shown in FIGS. 1 and 2. By forming the section 35 of a thickness such as to project slightly outwardly of the inner surface of the panel 10 when the lens trays are out of engagement therewith, the pivoting of the lens trays 14 and 15 into the closed position between the panels 10 and 11 will compress the resilient material of said sections 35 slightly and thereby effect a tight and positive dustproof seal around the open end of the lens recesses or pockets 16 or 17. The resilient sections 35 will further serve as protective cushioning means for the convex sides of the lenses.

As shown more particularly in FIG. 4, the web 12 is of such a controlled length between its free ends as to cause an edge portion 27 of the lens trays to engage the respective opposite ends of the web 12 when said trays are pivoted to a desired closed position (see FIGS. 1 and 2) at which time the open ends of the lens recesses or pockets 16 and 17 are completely closed or covered by the front panel 10. In this manner, the web 12 acts as stop means to render the finger engagement parts 21 and 22 of the lens trays accessible at all times by preventing the same from being pushed below the upper edges of the panels 10 and 11. In a similar fashion, the length of the web 13 is controlled in accordance with the contouring of the lens trays to act as stop means to locate the trays at a desired fully opened position relative to the panels 10 and 11 when another edge portion 28 of the lens trays engages a respective end of the web 13. When the lens trays 14 and 15 are fully opened (see tray 14, FIGS. 4 and 5), their respective lens recesses or pockets are completely exposed to receive the lenses or permit removal thereof.

As mentioned hereinabove, it is desirable to maintain contact lenses moist during periods of storage and in order to accomplish this, the sponge member 19 which is provided at the base of each of the lens compartments 16 and 17 is saturated with water or a suitable commonly known solution used for such purpose. The sponge member 19 further serves as cushioning means for the lenses. When it is desired to soak the lenses to remove mucous or eye secretions from the same, the lens trays 14 and 15 of the case are opened and filled with a soaking solution whereupon the opened case is preferably rested on a table or the like during the soaking period. In most instances, the lenses are only soaked during sleeping hours when the case is not needed to transport the lenses and when used as a carrying case, the soaking solution is emptied from the lens recesses or pockets 16 and 17 while leaving the sponge members 19 saturated with said solution. It has been found that a few drops of water or soaking solution in the sponge members 19 will keep the lenses moist for several days.

When the device of the invention is in use as a carrying case, the right eye lens is placed in the lens tray 14 and the left eye lens is placed in the tray 15. As mentioned above, the right and left lens trays are readily identifiable by facing the panel 10 of the case toward oneself and in addition to the panels 10 and 11 being of different contours and sizes to permit easy identification of the same visually or by touch, an engraved or embossed identification mark 31 may be placed on one of the lens trays if desired. It is also pointed out that as a further aid to visually quickly identifying the front and back panels of the case, said panels and lens trays may be painted different colors or formed of different colored plastic materials. Thus, with the panels 10 and 11 of one color and the trays 14 and 15 of a contrasting color, the front of the case would be readily distinguishable from the back thereof since a relatively large area of the side of each of the lens trays is exposed by the panel 10 whereas said lens trays are nearly completely concealed by the panel 11 when the case is viewed from the back (compare FIGS. 1 and 2).

In using the carrying case of the invention, the following procedure is recommended:

While carried in the case, the lenses should be positioned in their respective right and left lens receiving recesses or pockets with their outer convex surfaces facing outwardly of said pockets. In this manner, the concave inner surfaces of the lenses, which fit against the eyes when in use, are not touched and are directly exposed to the moist atmosphere adjacent the moistened sponge members 19.

In applying a lens to the eye, a selection of a right or left lens is made by initially facing the front panel 10 towards oneself as discussed above. Assuming, for example, that a right eye lens is to be removed from the case and placed on the eye, the lens tray 14 is pivoted to open position, as shown in FIG. 4, preferably with the thumb of the right hand while holding the body of the case with the left hand. The tip of one of the fingers of the right hand, usually the second finger, is next placed firmly against the outer convex surface of the lens in the now opened pocket 16 and while holding the finger against the lens, the case is turned over as shown in FIG. 5 by rotation of both hands simultaneously. The right hand is then slowly lowered away from the case, or the case is lifted away from the right hand, whereupon the lens will remain resting on the finger (see FIG. 5) and ready to be placed on the right eye. It will be noted that by following the above procedure, the concave side surface of the lens which engages the eye is not, at any time, touched by the fingers. Access to the left eye lens in the pocket 17 of member 15 would be accomplished in a similar manner with, of course, the right hand holding the body of the case and a finger of the left hand receiving the lens.

From the foregoing, it will be seen that simple, efficient and economical means have been provided for accomplishing all the objects and advantages of the invention. Nevertheless, it should be apparent that many changes in the details of construction and arrangement of parts may be made without departing from the spirit of the invention as expressed in the accompanying claims and the invention is not to be limited to the exact matters shown and described as only the preferred matters have been given by way of illustration.

Having described my invention, I claim:

1. A case for supporting contact lenses comprising an open-ended body part having a pair of relatively long and narrow panels, each of said panels being differently contoured and differently dimensioned whereby one may be identified from the other by the sense of touch or vision, said panels having spaced substantially parallel inner side walls interconnected along the major portion of one of the longitudinal edges thereof by a first web member and along the opposite longitudinal side edge thereof by an intermediate relatively short second web member, each of said web members having free edges facing said open ends of said body part, a lens-carrying tray intimately fitted between said walls at each of the open ends of said body part and eccentrically pivotally connected to said walls adjacent the respective opposite ends of said first web member, a lens-receiving pocket in each of said trays opening outwardly at one of the respective sides thereof and in which a contact lens may be loosely positioned, one edge part of each of said lens-carrying trays being adapted to engage a respective adjacent free edge of said second web member to locate the trays in a desired closed relation between said walls of said body part with said lens pockets completely covered by one of said walls and another edge part of each of said lens-carrying trays being adapted to engage a respective adjacent free edge of the first web member to locate said trays in a desired opened relation with said walls to expose said lens-recciving pockets, one of said trays being identified to receive the contact lens for the right eye and the other of said trays being adapted to receive the contact lens for the other eye.

2. A case for supporting contact lenses comprising an open-ended body part having a pair of relatively long and narrow panels, one of said panels being wider and longer than the other and having end edges which diverge relative to each other in a direction from one side edge thereof towards the other and the other of said panels having end edges which converge relative to each other in a direction from said one side edge towards the other whereby one may be identified from the other by the sense of touch or vision, said panels having spaced substantially parallel inner side walls interconnected along the major portion of one of the longitudinal edges thereof by a first web member and along the opposite longitudinal side edge thereof by an intermediate relatively short second web member, each of said web members having free edges facing said open ends of said body part, a lens-carrying tray intimately fitted between said walls at each of the open ends of said body part and eccentrically pivotally connected to said walls adjacent the respective opposite ends of said first web member, a lens-receiving pocket in each of said trays opening outwardly at one of the respective sides thereof and in which a contact lens may be loosely positioned, one edge part of each of said lens-carrying trays being adapted to engage a respective adjacent free edge of said second web member to locate the trays in a desired closed relation between said walls of said body part with said lens pockets completely covered by one of said walls and another edge part of each of said lens-carrying trays being adapted to engage a respective adjacent free edge of the first web member to locate said trays in a desired open relation with said walls to expose said lens-receiving pockets, one of said trays being identified to receive the contact lens for the right eye and the other of said trays being adapted to receive the contact lens for the other eye.

3. A case for supporting contact lenses comprising an open-ended body part having a pair of relatively long and narrow panels, said panels each having a relatively flat side edge and an opposite curved side edge with one of said panels being wider and longer than the other, one of said panels further having end edges which diverge relative to each other in a direction from said relatively flat side edge thereof towards the opposed curved side edge and the other of said panels having end edges which converge relative to each other in said direction whereby one panel may be identified from the other by the sense of touch or vision, said panels having spaced substantially parallel inner side walls interconnected along the major portion of one of the longitudinal edges thereof by a first web member and along the opposite longitudinal side edge thereof by an intermediate relatively short second web member, each of said web members having free edges facing said open ends of said body part, a lens-carrying tray intimately fitted between said walls at each of the open ends of said body part and eccentrically pivotally connected to said walls adjacent the respective opposite ends of said first web member, a lens-receiving pocket in each of said trays opening outwardly at one of the respective sides thereof and in which a contact lens may be loosely positioned, one edge part of each of said lens-carrying trays being adapted to engage a respective adjacent free edge of said second web member to locate the trays in a desired closed relation between said walls of said body part with said lens pockets completely covered by one of said walls and another edge part of each of said lens-carrying trays being adapted to engage a respective adjacent free edge of the first web member to locate said trays in a desired open relation with said walls to expose said lens-receiving pockets, one of said trays being identified to receive the contact lens for the right eye and the other of said trays being adapted to receive the contact lens for the other eye.

References Cited in the file of this patent

UNITED STATES PATENTS

| 889,352 | Bold | June 2, 1908 |
| 1,277,210 | Goelkel et al. | Aug. 27, 1918 |
| 1,547,142 | Bausch | July 21, 1925 |
| 2,788,891 | Taylor | Apr. 16, 1957 |
| 2,877,779 | Bromberg | Mar. 17, 1959 |

FOREIGN PATENTS

| 12,148 | Great Britain | 1912 |